US012172455B2

(12) United States Patent
Tanaka et al.

(10) Patent No.: US 12,172,455 B2
(45) Date of Patent: Dec. 24, 2024

(54) METHOD OF PRODUCING RECORDED MATTER WITH STEREOSCOPIC IMAGE

(71) Applicant: CANON KABUSHIKI KAISHA, Tokyo (JP)

(72) Inventors: Takatoshi Tanaka, Tokyo (JP); Olivia Herlambang, Kanagawa (JP); Yoshiyuki Nagase, Kanagawa (JP); Tetsufumi Shiba, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 18/061,517

(22) Filed: Dec. 5, 2022

(65) Prior Publication Data

US 2023/0173836 A1 Jun. 8, 2023

(30) Foreign Application Priority Data

Dec. 8, 2021 (JP) ................................. 2021-199589
Nov. 30, 2022 (JP) ................................. 2022-192051

(51) Int. Cl.
*B41M 3/06* (2006.01)
*B41J 11/00* (2006.01)

(52) U.S. Cl.
CPC ............ *B41M 3/06* (2013.01); *B41J 11/0021* (2021.01)

(58) Field of Classification Search
CPC ............................... B41M 3/06; B41J 11/0021
See application file for complete search history.

(56) References Cited

FOREIGN PATENT DOCUMENTS

| | | | | |
|---|---|---|---|---|
| JP | 2001-150812 | A | | 6/2001 |
| JP | 2013-71075 | A | | 4/2013 |
| JP | 6447546 | B2 | | 1/2019 |
| JP | 2020050719 | A | * | 4/2020 |

OTHER PUBLICATIONS

Yamada et al., Ink, Solid Formed Article, and Formation Method of Solid Formed Article, Apr. 2, 2004, [Abstract and Description of Embodiments] (Year: 2004).*

* cited by examiner

*Primary Examiner* — Lisa Solomon
(74) *Attorney, Agent, or Firm* — VENABLE LLP

(57) ABSTRACT

A method of producing a recorded matter including a stereoscopic image includes applying, onto a recording medium including a foamable layer, a first liquid composition containing a foam promoting or preventing component, and applying, onto the recording medium, a second liquid composition that does not contain the foam promoting or preventing component and the coloring material. A region to which the ink has been applied includes a first region and a second region in which amounts of ink applied are different, and a total of volatile solvents contained in the first liquid composition, the ink and the second liquid composition, which have been applied to the first region, is 95% by mass or more to 105% by mass or less with respect to a total of volatile solvents contained in the first liquid composition, the ink and the second liquid composition, which have been applied to the second region.

13 Claims, No Drawings

METHOD OF PRODUCING RECORDED MATTER WITH STEREOSCOPIC IMAGE

BACKGROUND OF THE INVENTION

Field of the Invention

The present invention relates to a method of producing a recorded matter including a stereoscopic image.

Description of the Related Art

Stereoscopic images such as wall paper and braille are formed by known methods, such as a recoating method using UV ink, a physical extrusion method such as embossing, and a printing method using a 3D printer, thermally expandable plastic foams, or the like. In particular, it has been known that the thermally expandable plastic foams have functions such as a heat shielding property, heat insulation, sound insulation, sound absorption, vibration isolation and weight reduction depending on materials of the foams and the state of the bubbles formed.

In the field of wall paper, it is known as a technique that an azo compound such as azodicarbonamide (ADCA) is used as a foaming agent, and a foamable layer containing such a foaming agent and a resin such as polyvinyl chloride is foamed to form an uneven structure. The uneven structure is demanded to be easily formed, and to enable sufficient adjustment of the height of unevenness on not only for a monochrome image but also for a color image.

For example, a planar image is recorded on a surface of a foamable sheet, and the gradation image (light-absorbing pattern) based on distance image data representing a stereoscopic shape is formed on a surface of a base material layer of the foamable sheet. Then, a method of emitting light toward the base material layer side to generate heat according to the shade of the image, and expanding the foamable sheet according to the distance image data has been proposed (Japanese Patent Application Laid-Open No. 2001-150812).

A method of forming a stereoscopic image by using a recording medium including a foamed resin layer has also been proposed (Japanese Patent No. 6447546). In this method of forming a stereoscopic image, first, a release film and a heat-absorbing ink layer are provided on a surface of the foamed resin layer of a recording medium, and a heat-absorbing ink is then applied to a region to be expanded. Next, a desired region is thermally foamed by radiation of radiant heat to carry out piling up, and the release film and the heat-absorbing ink layer are then peeled off at the same time, thereby capable of forming a desired stereoscopic image.

SUMMARY OF THE INVENTION

An object of the present invention is to provide a method of producing a recorded matter including a stereoscopic image, the method including a small number of steps and enabling the stereoscopic image to be easily formed with excellent uniformity of unevenness.

The above object is achieved by the present invention described below.

That is, according to an aspect of the present invention, provided is a method of producing a recorded matter including a stereoscopic image, which may include applying, onto a recording medium including a base material and a foamable layer that is provided on the base material and that contains a foamable particle foamed by heating, and a binder resin, a first liquid composition containing a foam promoting or preventing component that promotes or prevents foaming of the foamable particle, applying an ink containing a coloring material onto the recording medium, applying, onto the recording medium, a second liquid composition that does not contain the foam promoting or preventing component that promotes or prevents foaming of the foamable particle and the coloring material, and heating the recording medium to which the first liquid composition, the ink, and the second liquid composition have been applied to form a stereoscopic image, in which a region of the recording medium to which the ink has been applied includes a first region and a second region in which amounts of ink applied may be different, and an amount of ink applied to the first region may be greater than an amount of the ink applied to the second region, and a total of volatile solvents contained in the first liquid composition, the ink, and the second liquid composition, which have been applied to the first region, may be 95% by mass or more to 105% by mass or less with respect to a total of volatile solvents contained in the first liquid composition, the ink, and the second liquid composition, which have been applied to the second region.

Further features of the present invention will become apparent from the following description of exemplary embodiments.

DESCRIPTION OF THE EMBODIMENTS

<Method of Producing Recorded Matter with Stereoscopic Image>

However, in a method proposed in Japanese Patent Application Laid-Open No. 2001-150812, since a light-absorbing pattern is not directly formed on a foamable layer, it is difficult to cause the foamable layer to be sufficiently foamed. In addition, it is necessary that, after an image is recorded on the foamable layer, a light-absorbing pattern of a gradation image is recorded on a back surface side based on distance image data representing a stereoscopic shape. Therefore, while the height of unevenness is easily uniform, the number of steps for recording an image increases, and it is necessary to eliminate the light-absorbing pattern remaining on the back surface side.

In a method of forming a stereoscopic image proposed in Japanese Patent No. 6447546, a desired region is thermally expanded, and thereafter, a release film and a heat-absorbing ink layer are peeled off, which requires the time and effort. Furthermore, since the release film and the heat-absorbing ink layer, which have been peeled off, become waste, there is a problem that the time and effort are taken to discard the release film and heat-absorbing ink layer, which have become waste. Therefore, the present inventors have studied a method of producing a recorded matter including a stereoscopic image, which includes a small number of steps and enables the stereoscopic image to be easily formed with excellent uniformity of unevenness, and have achieved the present invention.

Hereinbelow, the present invention will be further described in detail with reference to preferred embodiments. Physical property values are values at room temperature (25° C.) unless otherwise specified. The term a "volatile solvent" contained in each of a first liquid composition, an ink, and a second liquid composition means a solvent with a boiling point of 150° C. or lower under a normal pressure (1 atm) condition.

A method of producing a recorded matter including a stereoscopic image according to the aspect of the present invention (hereinafter also simply referred to as a "method of producing a recorded matter") includes applying a first liquid composition onto a recording medium, applying an ink containing a coloring material on the recording medium, and applying a second liquid composition that does not contain a foam promoting or preventing component promoting or preventing foaming of a foamable particle and a coloring material on the recording medium.

The method of producing a recorded matter according to the aspect of the present invention further includes heating the recording medium to which the first liquid composition, the ink, and the second liquid composition have been applied to form a stereoscopic image. The recording medium includes a base material and a foamable layer that is provided on the base material and that contains a foamable particle foamed by heating, and a binder resin. The first liquid composition contains a foam promoting or preventing component that promotes or prevents foaming of the foamable particle. A region of the recording medium to which the ink has been applied includes a first region and a second region in which amounts of ink applied are different, and the amount of the ink applied to the first region is greater than the amount of the ink applied to the second region. In addition, a total of volatile solvents contained in the first liquid composition, the ink, and the second liquid composition, which have been applied to the first region, is 95% by mass or more to 105% by mass or less with respect to a total of volatile solvents contained in the first liquid composition, the ink, and the second liquid composition, which have been applied to the second region.

The amount of the first liquid composition applied to the first region is equal to the amount of the first liquid composition applied to the second region, and in a case where the second liquid composition is not applied to both regions, and the amounts of ink applied to the first region and the second region are different, a total amount of volatile solvents contained in the first liquid composition and the ink, which have been applied to the first region is different from a total amount of volatile solvents contained in the first liquid composition and the ink, which have been applied to the second region. As a result, drying efficiencies in the regions by heating are different from each other, and a drying efficiency in a region where the amount of the volatile solvent applied is small is high, and the foaming of the foamable particle is promoted or prevented more efficiently. By contrast, since the endothermic reaction due to the vaporization of the volatile solvent largely contributes to a region where the amount of the volatile solvent applied is large, the foaming of the foamable particle is not efficiently promoted or prevented as compared with a region where the amount of the volatile solvent applied is small. As a result, a degree of the foaming of the foamable particle varies between the region where the amount of the volatile solvent applied is small and the region where the amount of the volatile solvent applied is large, resulting in variation of the height of the formed unevenness.

As a result of studies, the present inventors have found that the difference between the amounts of volatile solvents caused by the difference between the amounts of the inks applied is eliminated by applying the second liquid composition to the region where the amount of the ink applied is smaller, and the variation in the height of the unevenness caused by the variation in the degree of the foaming of the foamable particle is able to be prevented, thereby achieving the present invention.

That is, the total of the volatile solvents contained in the first liquid composition, the ink, and the second liquid composition, which have been applied to the first region, is denoted by "$V_1$", and the total of the volatile solvents contained in the first liquid composition, the ink, and the second liquid composition, which have been applied to the second region is denoted by "$V_2$". In this case, in the method of producing a recorded matter according to the aspect of the present invention, $V_1$ is 95% by mass or more to 105% by mass or less with respect to $V_2$, that is, "$(V_1/V_2)\times100$" is 95% by mass or more to 105% by mass. As a result, the difference between the amounts of the volatile solvents applied to the regions is small, and the difference in the endothermic reaction due to the vaporization of the volatile solvent between the regions is not much large. Thus, a stereoscopic image in which the variation in the height of the unevenness caused by the difference in the degree of the foaming of the foamable particle is prevented can be formed.

In a case where $V_1$ is less than 95% by mass or more than 105% by mass with respect to $V_2$, the difference in the endothermic reaction due to the vaporization of the volatile solvent excessively increases between the region where the amount of the volatile solvent applied is small and the region where the amount of the volatile solvent is large. As a result, the degree of the foaming of the foamable particle greatly varies, the variation in the height of the formed unevenness cannot be prevented, and the stereoscopic image with excellent uniformity of the unevenness cannot be formed. The total of volatile solvents contained in the first liquid composition, the ink and the second liquid composition, which have been applied to the first region, is preferably 98% by mass or more to 102% by mass or less with respect to the total of volatile solvents contained in the first liquid composition, the ink and the second liquid composition, which have been applied to the second region.

The step of applying a first liquid composition onto a recording medium, the step of applying an ink containing a coloring material on the recording medium, and the step of applying a second liquid composition that does not contain a foam promoting or preventing component and a coloring material on the recording medium are not limited in this order and may be carried out in any order. For example, by using a printer equipped with tanks with which the first liquid composition, the ink containing the coloring material and the second liquid composition that does not contain the foam promoting or preventing component and the coloring material are respectively filled, the above three steps can proceed almost simultaneously.

(Recording Medium)

In the method of producing the recorded matter according to the aspect of the present invention, the recording medium including a base material and a foamable layer that is provided on the base material and that contains a foamable particle foamed by heating, and a binder resin is used.

[Base Material]

Examples of the base material include paper made of ordinary natural pulp; kenaf paper; a plastic film sheet such as polypropylene, polyethylene, or polyester; so-called synthetic paper made of, as fake paper, synthetic fibers, synthetic pulps, or synthetic resin films, or non-woven fabrics; and other materials.

[Foamable Particle]

A chemical foaming agent, a thermally expandable foaming agent, or other agents can be used as a foamable particle.

Examples of the chemical foaming agent includes azodicarbonamide (ADCA), azobisisobutyronitrile (AIBN), p,p-oxybisbenzenesulfonehydrazide (OBSH) and dinitrosopentamethylenetetramine (DPT).

The thermally expandable foaming agent is a foamable particle such as a microcapsule foaming agent having a so-called core-shell structure that has a shell layer including a resin and a volatile material enclosed within the shell layer.

In a case where heat is applied to the thermally expandable foaming agent, the resin constituting the shell layer is softened, and the volatile material in the core is vaporized to expand a volume, thereby the thermally expandable foaming agent expanding like a balloon.

The shell layer is made of a resin. Examples of the resin include polystyrene, a styrene-acrylic acid ester copolymer, a polyamide resin, polyacrylic acid ester, polyvinylidene chloride, polyacrylonitrile, polymethyl methacrylate, vinylidene chloride-acrylonitrile, a methacrylic acid ester-acrylic acid copolymer, a vinylidene chloride-acrylic acid copolymer, a vinylidene chloride-acrylic acid ester copolymer and other resins.

Examples of the volatile material include low-molecular-weight hydrocarbons such as ethane, ethylene, propane, propene, n-butane, isobutane, n-pentane, isopentane, neopentane, n-hexane, heptane, and petroleum ether; chlorofluorocarbons such as $CCl_3F$, $CCl_2F_2$, $CClF_3$, and $CClF_2$—$CClF_2$; tetraalkylsilanes such as tetramethylsilane, trimethylethylsilane, trimethylisopropylsilane, and trimethyl-n-propylsilane; and other volatile materials. Among these, a low-molecular-weight hydrocarbon having a molecular weight of 120 or less is preferably used.

The foamable layer contains a binder resin that functions as a binder in order to enhance the adhesion between the base material and the foamable layer. As the binder resin, a water-soluble polymer, a polymer soluble in an organic solvent, or other resins can be used. Examples of the binder resin include, in addition to polyvinyl alcohol, modified polyvinyl alcohol, polyacrylamide, and vinyl acetate, cellulose derivatives such as oxidized starch, etherified starch, carboxymethyl cellulose, and hydroxyethyl cellulose; casein; gelatin; soybean protein; a maleic anhydride resin; conjugated diene copolymer latices such as a styrene-butadiene copolymer and a methyl methacrylate-butadiene copolymer; (meth)acrylic polymer latices such as a polymer or copolymer composed of (meth)acrylic acid ester; vinyl-based polymer latices such as ethylene vinyl acetate copolymers; functional group-modified polymer latices composed of these various polymers; thermosetting synthetic resins such as a melamine resin and a urea resin; synthetic resins such as polymethyl methacrylate, a polyurethane resin, an unsaturated polyester resin, a vinyl chloride-vinyl acetate copolymer, polyvinyl butyral, and an alkyd resin; and other binder resins.

A mass ratio of the foamable particles to the binder resin is preferably foamable particles:binder resin=5:95 to 90:10. By setting the mass ratio of the foamable particles to the binder resin within the above range, both the foamability of the foamable particles and the binding property of the binder resin to the base material can be improved. The foamable layer may further contain components such as pigments, antioxidants, dyes, surfactants and the like, as long as the foamability is not impaired.

In order to produce the recording medium, first, a coating solution for a foamable layer containing a foamable particle is applied to a surface of the base material to form a coating layer. Next, a recording medium can be obtained by drying the formed coating layer to form a foamable layer. In order to apply the coating solution for the foamable layer onto the surface of the base material, air knife coaters, die coaters, blade coaters, gate roll coaters, bar coaters, rod coaters, roll coaters, gravure coaters, curtain coaters and other coaters, which are known in the related art, can be used. An example of a method of drying the coating layer includes a blowing method with hot air. Drying conditions (temperature, air volume, time and other conditions) may be appropriately set according to a type of the base material, a composition of the coating solution and the like. However, a drying temperature is necessary to be lower than a foaming initiation temperature of the foamable particle used.

It is preferable to provide the foamable layer of 2 $g/m^2$ or more per side of the base material. By providing the foamable layer of 2 $g/m^2$ or more, the foamability can be further improved. The recording medium (product) in which a foamable layer containing a foamable particle is included in advance may also be used.

A back coat layer may be provided on a surface of the base material opposite to the surface on which the foamable layer is provided. The back coat layer may be the same layer as the foamable layer containing the foamable particle, or may be a layer other than the foamable layer. In addition, an adhesive layer containing an adhesive resin such as an acrylic resin or an ink receiving layer for fixing a coloring material may be formed.

(First Liquid Composition)

The first liquid composition contains the foam promoting or preventing component (also referred to as foaming control agent) that promotes or prevents the foaming of the foamable particle included in the foamable layer of the recording medium.

The foam promoting or preventing component can be appropriately selected and used according to a type of a thermoplastic resin. Examples of the foam promoting or preventing component include 2-pyrrolidone, dimethylsulfoxide, N,N-dimethylformamide, N-methyl-2-pyrrolidone and the like. A content of the foam promoting or preventing component in the first liquid composition is preferably 10% by mass or more to 70% by mass or less with respect to the total mass of the first liquid composition.

An absolute value of a difference ($|SP1-SP2|$) between a solubility parameter (SP1) of a resin contained in the shell layer of the foamable particle (thermally expandable foaming agent) and a solubility parameter (SP2) of the foam promoting or preventing component is preferably 3.5 or less. By setting the absolute value of the difference between the solubility parameters within the above numerical range, the resin constituting the shell layer can be softened more efficiently, and the foamable particle having the shell layer in which the resin is softened can be efficiently foamed.

As a result, a stereoscopic image with excellent uniformity of unevenness can be formed.

An absolute value of a difference ($|HSP_1-HSP_2|$) between a Hansen solubility parameter ($HSP_1$) of a resin contained in the shell layer of the foamable particle (thermally expandable foaming agent) and a Hansen solubility parameter ($HSP_2$) of a foam promoting or preventing component is preferably 20.0 or less. By setting the absolute value of the difference between the Hansen solubility parameters within the above numerical range, the foamability of the foamable particle in the region to which the first liquid composition has been applied can be further improved.

The solubility parameter (SP value) is a value calculated by calculation. Each of the Hansen solubility parameters (HSP values) is also an actual value measured and calculated by a dynamic light scattering method.

As components other than the liquid components, water-soluble organic compounds that are solid at a temperature of 25° C., such as urea and a derivative thereof, trimethylolpropane and trimethylolethane, can be used. Furthermore, as necessary, various additives such as pH adjusters, antiblowing agents, rust inhibitors, preservatives, antifungal agents, antioxidants, reduction inhibitors and chelating agents may be added to a foaming accelerator.

(Ink Containing Coloring Material)

A dye and a pigment can be used as the coloring material. The dye is preferably an anionic dye, more preferably a dye having an azo skeleton, a dye having a phthalocyanine skeleton, a dye having an anthrapyridone skeleton, or a dye having a xanthene skeleton. From the viewpoint of ink reliability, a dye that is soluble in ink is preferable. In addition, from the viewpoint of image color development, a dye that easily agglomerates on a recording medium is preferable. By appropriately selecting the type of skeletons, the number of anionic groups and the like, a balance between solubility in ink and agglomerating properties on the recording medium can be adjusted.

A content (% by mass) of the dye in the ink is preferably 1.0% by mass or more to 10.0% by mass or less, and more preferably 2.0% by mass or more to 8.0% by mass or less with respect to the total mass of the ink.

Specific examples of the pigment include inorganic pigments such as carbon black and titanium oxide; and organic pigments such as azo, phthalocyanine, quinacridone, isoindolinone, imidazolone, diketopyrrolopyrrole and dioxazine. Examples of a method of dispersing the pigment include a resin dispersion pigment using a resin as a dispersant, and a self-dispersion pigment in which a hydrophilic group is bonded to a surface of a particle in the pigment. In addition, a resin-bonded pigment in which an organic group containing a resin is chemically bonded to a surface of a particle in the pigment, a microcapsule pigment or the like, in which a surface of a particle in the pigment is coated with a resin or the like, can also be used. Pigments with different dispersion methods can be used in combination. A content (% by mass) of the pigment in the ink is preferably 1.0% by mass or more to 10.0% by mass or less, and more preferably 2.0% by mass or more to 8.0% by mass or less with respect to the total mass of the ink.

The ink containing the coloring material is preferably an aqueous ink containing water as an aqueous medium. The aqueous medium can further contain a water-soluble organic solvent. Deionized water (ion exchange water) is preferably used as water. As a water-soluble organic solvent, any one of alcohols, glycols, alkylene glycols, polyethylene glycols, nitrogen-containing compounds, sulfur-containing compounds or the like, which can be used for an ink jet ink, can be used. A content (% by mass) of water in the ink is preferably 50.0% by mass or more to 95.0% by mass or less with respect to the total mass of the ink. In addition, a content (% by mass) of the water-soluble organic solvent in the ink is preferably 3.0% by mass or more to 50.0% by mass or less with respect to the total mass of the ink. In a case where the content of the water-soluble organic solvent is less than 3.0% by mass, reliability such as sticking resistance may be insufficient in a case where the ink is used in an ink jet recording apparatus. On the other hand, in a case where the content of the water-soluble organic solvent is more than 50.0% by mass, the ink supply failure may tend to occur.

The ink may further contain a water-soluble organic compound that is in a solid state at room temperature (25° C.), such as urea and a derivative thereof, trimethylolpropane, trimethylolethane and the like. In addition, as necessary, the ink may contain various additives such as surfactants, resins, pH adjusters, antiblowing agents, rust inhibitors, preservatives, antifungal agents, antioxidants, reduction inhibitors and chelating agents.

(Second Liquid Composition)

The second liquid composition does not contain the foam promoting or preventing component that promotes or prevents the foaming of the foamable particle and the coloring material, which are included in the foamable layer of the recording medium. The second liquid composition is preferably at least any one of a clear ink or a reaction solution, and is more preferably a clear ink.

The clear ink containing no coloring material can suitably contain components other than the coloring material among the components used in the ink containing the coloring material described above.

The reaction solution contains a reaction agent that reacts with the ink. This reaction agent is a component that causes components (resins, self-dispersion pigments and the like) having anionic groups in the ink to agglomerate in a case where the reaction agent is brought into contact with the ink. Examples of the reaction agent include polyvalent metal ions, cationic components such as cationic resins, organic acids and the like.

Examples of the polyvalent metal ions include divalent metal ions such as $Ca^{2+}$, $Cu^{2+}$, $Ni^{2+}$, $Mg^{2+}$, $Sr^{2+}$, $Ba^{2+}$ and $Zn^{2+}$; trivalent metal ions such as $Fe^{3+}$, $Cr^{3+}$, $Y^{3+}$ and $Al^{3+}$. A polyvalent metal salt (which may be a hydrate) composed of a polyvalent metal ion and an anion, which are bonded to each other, can be used in order to contain the polyvalent metal ion in the reaction solution. Examples of anions include inorganic anions such as $Cl^-$; $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; organic anions such as $HCOO^-$, $(COO^-)_2$, $COOH(COO^-)$, $CH_3COO^-$; $C_2H_4(COO^-)_2$, $C_6H_5COO^-$, $C_6H_4(COO^-)_2$ and $CH_3SO_3^-$. In a case where the polyvalent metal ions are used as the reaction agent, a content (% by mass) of the reaction agent in terms of a polyvalent metal salt in the reaction solution is preferably 1.0% by mass or more to 10.0% by mass or less with respect to the total mass of the reaction solution.

The reaction solution containing an organic acid has a buffering ability in an acidic region (less than pH 7.0 and preferably pH 2.0 to 5.0), thereby converting the anionic groups of the components present in the ink into an acid form to agglomerate. Examples of the organic acids include monocarboxylic acids such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid, coumaric acid and salts thereof; dicarboxylic acids such as oxalic acid, malonic acid, succinic acid, glutaric acid, adipic acid, maleic acid, fumaric acid, itaconic acid, sebacic acid, phthalic acid, malic acid, tartaric acid and salts or hydrogen salts thereof; tricarboxylic acids such as citric acid and trimellitic acid, and salts or hydrogen salts thereof; tetracarboxylic acids such as pyromellitic acid, and salts or hydrogen salts thereof, and other acids.

Examples of the cationic resins include resins having a primary to tertiary amine structure, resins having a quaternary ammonium salt structure and other resins. Examples of the cationic resins include resins having structures such as vinylamine, allylamine, vinylimidazole, vinylpyridine, dimethylaminoethyl methacrylate, ethyleneimine and guanidine. In order to increase the solubility in the reaction solution, a cationic resin and an acidic compound may be used in combination, or the cationic resin may be subjected to a quaternization treatment. In a case where the cationic resins are used as the reaction agent, a content (% by mass) of the cationic resins in the reaction solution is preferably 1.0% by mass or more to 10.0% by mass or less with respect to the total mass of the reaction solution.

The reaction solution can contain, as components other than the reaction agent, the same components as those that can be contained in the ink described above, such as water, a water-soluble organic solvent and other additives.

In addition, both the clear ink and the reaction solution, which are used as the second liquid composition, may be applied to the recording medium. In this case, the step of applying the second liquid composition to the recording medium includes a step of applying the clear ink to the recording medium and a step of applying the reaction solution to the recording medium. Then, the total of the volatile solvents in the recording medium is calculated as the total of the volatile solvents contained in the first liquid composition, the ink, the clear ink and the reaction solution. In addition, the reaction agent contained in the reaction solution may react not only with the ink but also with the clear ink.

(Heating of Recording Medium)

The method of producing a recorded matter of the present invention includes the step of heating the recording medium to which the first liquid composition, the ink, and the second liquid composition have been applied to form a stereoscopic image. By heating the recording medium to which the first liquid composition, the ink and the second liquid composition have been applied, the foamable particle contained in the foamable layer of the recording medium can be foamed to form a stereoscopic image; thereby a desired recorded matter can be obtained. The heating temperature of the recording medium is preferably equal to or higher than the foam initiation temperature of the foamable particle, and is more preferably equal to or lower than the foam initiation temperature of the foamable particle plus 15° C. As a device for heating the recording medium, for example, a dryer, an oven, a heater, an iron and the like can be used.

According to the aspect of the present invention, the method of producing a recorded matter including a stereoscopic image, the method including a small number of steps and enabling the stereoscopic image to be easily formed with excellent uniformity of unevenness can be provided.

EXAMPLES

The present invention will be described in more detail below with reference to Examples and Comparative Examples, but the present invention is not limited by the following Examples as long as it does not depart from the scope of the invention. "Parts" and "%" regarding component amounts are based on mass unless otherwise specified.

<Preparation of Foamable Particle>

According to the description of Example 1 in Japanese Patent Application Laid-Open No. 2013-71075, foamable particles formed of a core made of isopentane and isooctane and a shell layer that contains the core and that is formed of an acrylonitrile-methacrylic acid copolymer were prepared. A foaming initiation temperature of the foamable particles, which is measured by using a thermomechanical analyzer (TMA) (trade name "TMA2940", manufactured by TA Instruments), was 90° C.

<Preparation of Recording Medium>

(Recording Medium A)

A polypropylene synthetic paper (trade name "New Yupo FGS110", manufactured by Yupo Corporation) was prepared as a base material. An acrylic emulsion (trade name "Movinyl 7820", manufactured by Japan Coating Resin Corp.) and foamable particles were added to ion exchange water so that a mass ratio was resin:foamable particles=100:50, and the mixture was sufficiently stirred to prepare a coating solution A. The coating solution A was applied to the base material prepared so that the coating amount was 40 g/m$^2$, and dried in an oven at 60° C. for 5 minutes to obtain a recording medium A.

(Recording Medium B)

An alumina hydrate (trade name "DISPERSAL HP14" manufactured by Sasol Ltd.) in a content of 30% was added to ion exchange water. Furthermore, 1.6 parts of methanesulfonic acid was added to 100 parts of the alumina hydrate and stirred to obtain a colloidal sol. The obtained colloidal sol was diluted with ion exchange water to obtain an inorganic particle dispersion 1 containing, as inorganic particles, an alumina hydrate in a content of 27%.

Polyvinyl alcohol (trade name "PVA235", manufactured by Kuraray Co., Ltd., degree of polymerization: 3,500, degree of saponification: 88%) was dissolved in ion exchange water to obtain a polyvinyl alcohol aqueous solution in a solid content of 8.0%. The obtained polyvinyl alcohol aqueous solution was added to and mixed with the inorganic particle dispersion 1 so that the amount of polyvinyl alcohol was 11 parts with respect to 100 parts of the inorganic particles.

On the other hand, orthoboric acid, which is a cross-linking agent, was dissolved in ion exchange water to obtain a boric acid aqueous solution in a content of orthoboric acid of 3.0%. The obtained boric acid aqueous solution was added to and mixed with the inorganic particle dispersion liquid 1 so that the amount of boric acid was 2 parts with respect to 100 parts of the inorganic particles to obtain an ink receiving layer coating solution 1. The ink receiving layer coating solution 1 was applied onto a surface of the recording medium A described above so that the coating amount was 10 g/m$^2$, and then dried in an oven at 60° C. for 20 minutes to obtain a recording medium B.

<Preparation of First Liquid Composition>

Three liquids X, Y and Z with different solubility parameters and Hansen solubility parameters were prepared. The liquid X is dimethylsulfoxide (DMSO), the liquid Y is N-methyl-2-pyrrolidone (NMP), and the liquid Z is acetic acid.

30 parts of the liquid X, 20 parts of ethylene glycol, 0.2 parts of a nonionic surfactant (trade name: "Acetylenol E100", manufactured by Kawaken Fine Chemicals Co., Ltd.), and 49.8 parts of ion exchange water were mixed. After sufficiently stirring a mixture obtained as described above, the mixture was pressure-filtered through a filter with a pore size of 1.2 μm to obtain a liquid composition X. In addition, first liquid compositions Y and Z were obtained in the same manner as the first liquid composition X described above, except that the liquids Y and Z were used instead of the liquid X. Volatile solvents in the obtained first liquid compositions X, Y and Z are all ion exchange water.

<Preparation of Pigment Dispersion Liquid>

(Pigment Dispersion Liquid 1)

10.0 parts of a pigment (C.I. Pigment Red 122), 9.4 parts of a liquid containing a styrene-acrylic acid copolymer (resin A) having an acid value of 120 mgKOH/g and a weight average molecular weight of 8,000, and 80.6 parts of ion exchange water were mixed to obtain a mixture. The obtained mixture and 200 parts of zirconia beads each of which has a diameter of 0.3 mm were placed in a batch-type vertical sand mill (manufactured by IMEX Co., Ltd.) and subjected to dispersion treatment for 5 hours while cooling with water. After removing coarse particles by centrifugation, pressure filtration was performed with a cellulose acetate filter (manufactured by ADVANTEC CO., LTD.) with a pore size of 3.0 μm, to prepare a pigment dispersion 1 in which a content of a pigment was 10.0% and a content of a resin dispersant (resin A) was 3.0%.

(Pigment Dispersion Liquid 2)

A pigment Dispersion 2 was prepared in the same manner as the case of the pigment Dispersion 1 described above, except that C. I. Pigment Blue 15:3 was used as the pigment.

(Pigment Dispersion Liquid 3)

A pigment Dispersion 3 was prepared in the same manner as the case of the pigment Dispersion 1 described above, except that C. I. Pigment Yellow 74 was used as the pigment.

<Preparation of Ink and Second Liquid Composition>

Each component (unit: parts) illustrated in Table 1 was mixed, sufficiently stirred, and pressure-filtered through a filter with a pore size of 1.2 μm to obtain inks 1 to 3 each of which contains a coloring material, a clear ink that is a second liquid composition and that contains no coloring material, and a reaction solution that contains 5.0 parts of calcium nitrate and that contains no coloring material. In Table 1, "Acetylenol E100" is a trade name of a nonionic surfactant manufactured by Kawaken Fine Chemicals Co., Ltd. Volatile solvents in the obtained inks 1 to 3, the obtained clear ink, and the obtained reaction liquid are all ion exchange water.

TABLE 1

Composition of ink and Second liquid composition

| | Ink | | | Second liquid composition | |
|---|---|---|---|---|---|
| | 1 | 2 | 3 | Clear ink | Reaction solution |
| Pigment dispersion1 | 50.0 | | | | |
| Pigment dispersion2 | | 50.0 | | | |
| Pigment dispersion2 | | | 50.0 | | |
| Calcium nitrate | | | | | 2.0 |
| Glycelin | 15.0 | 15.0 | 15.0 | 15.0 | 15.0 |
| Ethylene glycol | 10.0 | 10.0 | 10.0 | 10.0 | 10.0 |
| Acetylenol E100 | 0.5 | 0.5 | 0.5 | 0.5 | 0.5 |
| Ion exchange water | 24.5 | 24.5 | 24.5 | 74.5 | 72.5 |

<Production of Recorded Matter>

Cartridges were filled with the first liquid compositions X, Y and Z, and the inks 1 to 3, the clear ink, and the reaction liquid respectively, and were set in an ink jet recording apparatus (trade name "PIXUS PRO-10S", manufactured by Canon Inc.). In the present Examples, an image recorded under a condition in which 8 ink droplets of about 3.8 ng are applied to a unit region of 1/600 inch×1/600 inch is defined as having a recording duty of 100.0%.

Example 1

By using the ink jet recording apparatus described above, the first liquid composition X and the ink 1 were each applied to the first region of the recording medium A at a recording duty of 60.0%. Furthermore, the first liquid composition X, the ink 1 and the clear ink (the second liquid composition) were applied to the second region of the recording medium A at recording duties of 60.0%, 30.0% and 27.5%, respectively. Thereafter, a stereoscopic image was formed by heating at 95° C. for 30 seconds with a hot air drying device to obtain a recorded matter 1. A total $V_1$ of the volatile solvents contained in the first liquid composition, the ink and the clear ink applied to the first region was 21.5 ng. In addition, a total $V_2$ of the volatile solvents contained in the first liquid composition, the ink and the clear ink applied to the second region was 21.5 ng, and "$(V_1/V_2)\times100$" was 100%.

Examples 2 to 15, Comparative Examples 1 to 3

Stereoscopic images were formed in the same manner as in Example 1, except that conditions illustrated in Tables 2-1 and 2-2 were used to obtain recorded matters 2 to 16. The total $V_1$ (ng) of the volatile solvents contained in the first liquid composition, the ink and the second liquid composition applied to the first region was is illustrated in Table 2-1. In addition, the total $V_2$ (ng) of the volatile solvents contained in the first liquid composition, the ink and the second liquid composition applied to the second region and "$(V_1/V_2)\times100$" (%) were illustrated in Table 2-2.

TABLE 2-1

Production of recorded matter

| | | First region | | | | | | | |
|---|---|---|---|---|---|---|---|---|---|
| | | First Liquid Composition | | | | Ink | | Second Liquid Composition | Total $V_1$ of |
| | Recording medium | Type | $SP_2$ | $HSP_2$ | Recording duty (%) | Type | Recording duty (%) | Recording duty (%) | volatile solvents (ng) |
| Example 1 | A | X | 2.0 | 8.4 | 60.0 | 1 | 60.0 | 0 | 21.5 |
| Example 2 | A | X | 2.0 | 8.4 | 60.0 | 2 | 60.0 | 0 | 21.5 |
| Example 3 | A | X | 2.0 | 8.4 | 60.0 | 3 | 60.0 | 0 | 21.5 |
| Example 4 | A | X | 2.0 | 8.4 | 60.0 | 1, 2, 3 | 60.0 | 0 | 21.5 |
| Example 5 | A | X | 2.0 | 8.4 | 60.0 | 1 | 60.0 | 0 | 21.5 |
| Example 6 | A | X | 2.0 | 8.4 | 60.0 | 1 | 60.0 | 0 | 21.5 |
| Example 7 | A | X | 2.0 | 8.4 | 60.0 | 1 | 60.0 | 0 | 21.5 |
| Example 8 | A | X | 2.0 | 8.4 | 60.0 | 1 | 60.0 | 0 | 21.5 |
| Example 9 | A | X | 2.0 | 8.4 | 60.0 | 1 | 60.0 | 0 | 21.5 |
| Example 10 | A | X | 2.0 | 8.4 | 60.0 | 1 | 60.0 | 0 | 21.5 |
| Example 11 | A | Y | 3.5 | 9.2 | 60.0 | 1 | 60.0 | 0 | 21.5 |

TABLE 2-1-continued

| Production of recorded matter | | | | | | | | | |
|---|---|---|---|---|---|---|---|---|---|
| | | First region | | | | | | | |
| | | First Liquid Composition | | | | Ink | | Second Liquid Composition | Total $V_1$ of |
| | Recording medium | Type | $SP_2$ | $HSP_2$ | Recording duty (%) | Type | Recording duty (%) | Recording duty (%) | volatile solvents (ng) |
| Example 12 | A | X | 2.4 | 20.0 | 60.0 | 1 | 60.0 | 0 | 21.5 |
| Example 13 | B | X | 2.0 | 8.4 | 60.0 | 1 | 60.0 | 0 | 21.5 |
| Example 14 | A | X | 2.0 | 8.4 | 60.0 | 1 | 60.0 | 0 | 21.5 |
| Example 15 | A | X | 2.0 | 8.4 | 60.0 | 1 | 60.0 | 0 | 21.5 |
| Comparative 1 Example 1 | A | X | 2.0 | 8.4 | 60.0 | 1 | 60.0 | 0 | 21.5 |
| Comparative 1 Example 2 | A | X | 2.0 | 8.4 | 60.0 | 1 | 60.0 | 0 | 21.5 |
| Comparative 1 Example 3 | A | X | 2.0 | 8.4 | 60.0 | 1 | 60.0 | 0 | 21.5 |

TABLE 2-2

| Production of recorded matter | | | | | | | | | | |
|---|---|---|---|---|---|---|---|---|---|---|
| | Second region | | | | | | | | | |
| | | | | | | | Second liquid composition | | | |
| | First liquid composition | | | | Ink | | Clear ink | solution | Total $V_2$ | |
| | Type | $SP_2$ | $HSP_2$ | Recording duty (%) | Type | Recording duty (%) | Recording duty (%) | Recording duty (%) | of volatale solvents $V_2$ (ng) | $(V_1/V_2) \times 100$ (%) |
| Example 1 | X | 2.0 | 8.4 | 60.0 | 1 | 30.0 | 27.5 | 0 | 21.5 | 100 |
| Example 2 | X | 2.0 | 8.4 | 60.0 | 1 | 30.0 | 27.5 | 0 | 21.5 | 100 |
| Example 3 | X | 2.0 | 8.4 | 60.0 | 1 | 30.0 | 27.5 | 0 | 21.5 | 100 |
| Example 4 | X | 2.0 | 8.4 | 60.0 | 1 | 30.0 | 27.5 | 0 | 21.5 | 100 |
| Example 5 | X | 2.0 | 8.4 | 60.0 | 1 | 30.0 | 29.0 | 0 | 21.9 | 98 |
| Example 6 | X | 2.0 | 8.4 | 60.0 | 1 | 30.0 | 30.0 | 0 | 22.1 | 97 |
| Example 7 | X | 2.0 | 8.4 | 60.0 | 1 | 30.0 | 32.0 | 0 | 22.5 | 95 |
| Example 8 | X | 2.0 | 8.4 | 60.0 | 1 | 30.0 | 25.5 | 0 | 21.1 | 102 |
| Example 9 | X | 2.0 | 8.4 | 60.0 | 1 | 30.0 | 24.5 | 0 | 20.8 | 103 |
| Example 10 | X | 2.0 | 8.4 | 60.0 | 1 | 30.0 | 23.0 | 0 | 20.5 | 105 |
| Example 11 | Y | 3.5 | 9.2 | 60.0 | 1 | 30.0 | 27.5 | 0 | 21.5 | 100 |
| Example 12 | Z | 2.4 | 20.0 | 60.0 | 1 | 30.0 | 27.5 | 0 | 21.5 | 100 |
| Example 13 | X | 2.0 | 8.4 | 60.0 | 1 | 30.0 | 27.5 | 0 | 21.5 | 100 |
| Example 14 | X | 2.0 | 8.4 | 60.0 | 1 | 30.0 | 0 | 28.0 | 21.5 | 100 |
| Example 15 | X | 2.0 | 8.4 | 60.0 | 1 | 30.0 | 20.0 | 8.0 | 21.6 | 100 |
| Comparative Example 1 | X | 2.0 | 8.4 | 60.0 | 1 | 30.0 | 33.0 | 0 | 22.8 | 94 |
| Comparative Example 2 | X | 2.0 | 8.4 | 60.0 | 1 | 30.0 | 22.0 | 0 | 20.3 | 106 |
| Comparative Example 3 | X | 2.0 | 8.4 | 60.0 | 1 | 30.0 | 0 | 0 | 15.3 | 141 |

<Evaluation>

(Uniformity of Unevenness)

A surface of each of the obtained recorded matters was visually observed, and the uniformity of unevenness was evaluated according to the following evaluation standards. The results are illustrated in Table 3.

AA: There was almost no difference in the height of the unevenness between the regions, and the height of the unevenness was sufficient.

A: There was almost no difference in the height of the unevenness between the regions, but the height of the unevenness was slightly low.

B: There was a slight difference in the height of the unevenness between the regions, but the level was almost unnoticeable.

C: There was a slight difference in the height of the unevenness between the regions, but the level caused no problem.

D: The level was such that a difference in the height of the unevenness between the regions was clearly felt.

TABLE 3

| | Evaluation of recorded matter |
|---|---|
| | Uniformity of unevenness |
| Example 1 | AA |
| Example 2 | AA |
| Example 3 | AA |
| Example 4 | AA |
| Example 5 | AA |
| Example 6 | B |
| Example 7 | C |
| Example 8 | AA |
| Example 9 | B |
| Example 10 | C |
| Example 11 | A |
| Example 12 | A |
| Example 13 | AA |
| Example 14 | AA |
| Example 15 | AA |
| Comparative Example 1 | D |
| Comparative Example 2 | D |
| Comparative Example 3 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-199589, filed Dec. 8, 2021, and Japanese Patent Application No. 2022-192051, filed Nov. 30, 2022, which are hereby incorporated by reference herein in their entirety.

What is claimed is:

1. A method of producing a recorded matter including a stereoscopic image, the method comprising:

applying, onto a recording medium including a base material and a foamable layer that is provided on the base material and that contains a foamable particle foamed by heating, and a binder resin, a first liquid composition containing a foam promoting or preventing component that promotes or prevents foaming of the foamable particle;

applying an ink containing a coloring material onto the recording medium;

applying, onto the recording medium, a second liquid composition that does not contain the foam promoting or preventing component that promotes or prevents the foaming of the foamable particle and the coloring material; and heating the recording medium to which the first liquid composition, the ink and the second liquid composition have been applied to form a stereoscopic image, wherein a region of the recording medium to which the ink has been applied includes a first region and a second region in which amounts of the ink applied are different, and the amount of the ink applied to the first region is greater than the amount of the ink applied to the second region, and a total of volatile solvents contained in the first liquid composition, the ink and the second liquid composition, which have been applied to the first region, is 95% by mass or more to 105% by mass or less with respect to a total of volatile solvents contained in the first liquid composition, the ink and the second liquid composition, which have been applied to the second region.

2. The method according to claim 1, wherein the total of the volatile solvents contained in the first liquid composition, the ink and the second liquid composition, which have been applied to the first region, is 98% by mass or more to 102% by mass or less with respect to the total of the volatile solvents contained in the first liquid composition, the ink and the second liquid composition, which have been applied to the second region.

3. The method according to claim 1, wherein the foamable particle is a thermally expandable foaming agent including a shell layer containing a resin and a volatile material enclosed within the shell layer, and the volatile material is a low-molecular-weight hydrocarbon having a molecular weight of 120 or less.

4. The method according to claim 1, wherein the second liquid composition is a clear ink.

5. The method according to claim 1, wherein each of the volatile solvents is a solvent with a boiling point of 150° C. or lower under a pressure of 1 atm.

6. The method according to claim 1, wherein the foam promoting or preventing component is 2-pyrrolidone, dimethylsulfoxide, N,N-dimethylformamide, or N-methyl-2-pyrrolidone.

7. The method according to claim 1, wherein a content of the foam promoting or preventing component in the first liquid composition is 10% by mass or more to 70% by mass or less with respect to a total mass of the first liquid composition.

8. The method according to claim 1, wherein the foamable particle is a thermally expandable foaming agent including a shell layer containing a resin and a volatile material enclosed within the shell layer, and wherein an absolute value of a difference (|SP1−SP2|) between a solubility parameter (SP1) of a resin contained in the shell layer and a solubility parameter (SP2) of the foam promoting or preventing component is 3.5 or less.

9. The method according to claim 1, wherein the foamable particle is a thermally expandable foaming agent including a shell layer containing a resin and a volatile material enclosed within the shell layer, and wherein an absolute value of a difference (|HSP1−HSP2|) between a Hansen solubility parameter (HSP1) of a resin contained in the shell layer and a Hansen solubility parameter (HSP2) of the foam promoting or preventing component is 20.0 or less.

10. The method according to claim 1, wherein the ink is an aqueous ink containing water, and wherein a content of the water in the ink is 50.0% by mass or more to 95.0% by mass or less with respect to a total mass of the ink.

11. The method according to claim 1, wherein the second liquid composition is at least one selected from the group consisting of a clear ink and a reaction solution.

12. The method according to claim 1, wherein in heating the recording medium to which the first liquid composition, the ink and the second liquid composition have been applied to form the stereoscopic image, a heating temperature of the recording medium is equal to or higher than a foam initiation temperature of the foamable particle, and equal to or lower than the foam initiation temperature of the foamable particle plus 15° C.

13. The method according to claim 1, wherein the first liquid composition, the ink, and the second liquid composition are applied onto the recording medium by an ink jet recording apparatus.

* * * * *